UNITED STATES PATENT OFFICE.

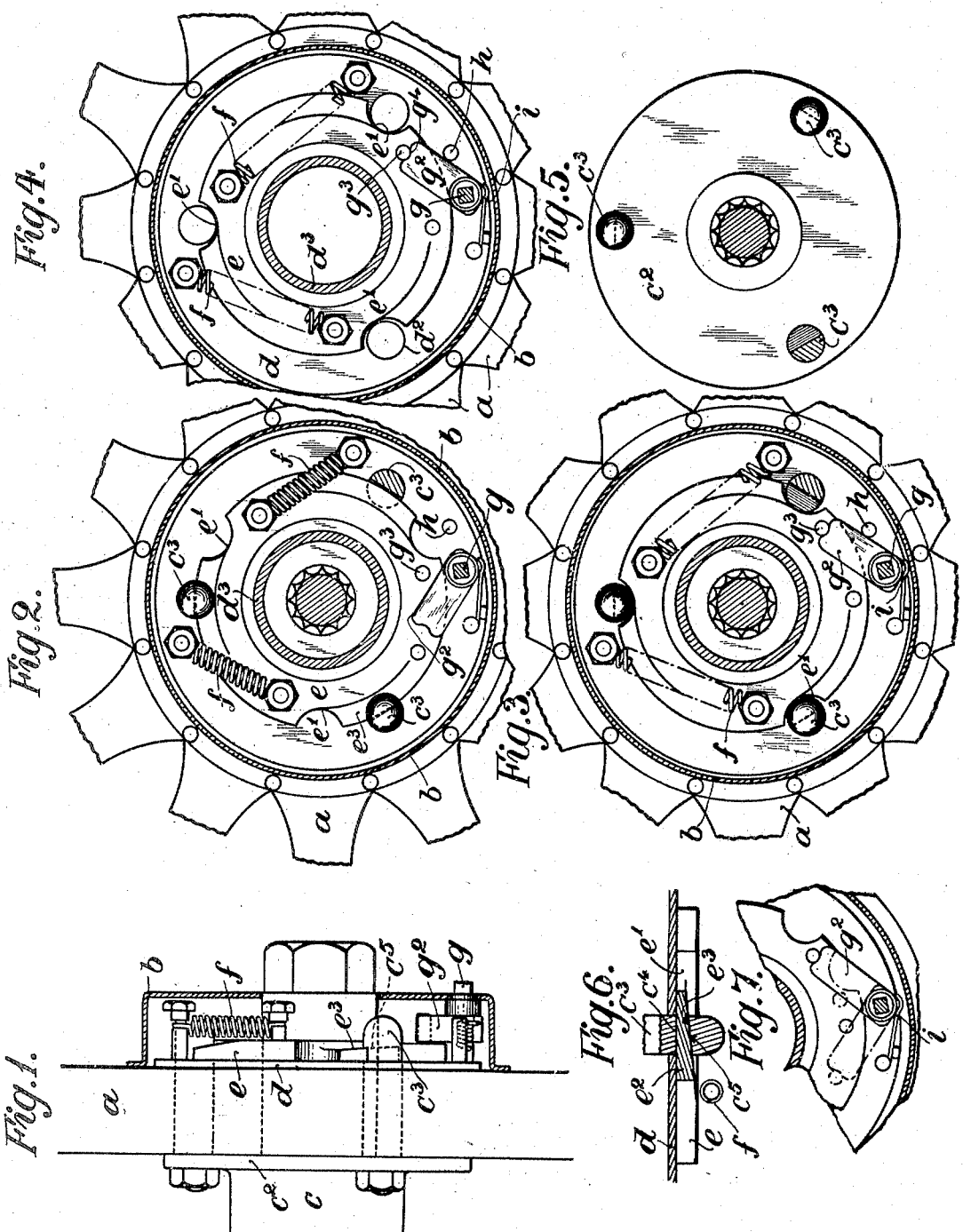

JAMES LESLIE EDWARDS, OF BIRMINGHAM, ENGLAND.

FASTENING FOR DETACHABLE WHEELS.

1,308,488.     Specification of Letters Patent.     Patented July 1, 1919.

Application filed December 6, 1917. Serial No. 205,800.

*To all whom it may concern:*

Be it known that I, JAMES LESLIE EDWARDS, subject of the King of Great Britain, residing at 313 Franklin road, Kings Norton, Birmingham, England, engineer, have invented certain new and useful Improvements in Fastenings for Detachable Wheels, of which the following is a specification.

This invention has reference to locking mechanism for use in connection with detachable vehicle wheels which are mounted upon a system of driving pins permanently carried by a standing hub or the like.

According to the said invention, a rotatable locking ring is mounted on the center of a wheel so as to be bodily removable with the latter, and is inclosed in a dust-proof case that preferably is a fixture on the wheel; the operation of the locking ring for fastening or unfastening the wheel being effected by a lever, or the like on the exterior of said case. The ring is formed, at its outer edge, with a series of clearances that correspond, in number and disposition, to the driving pins on the fixed hub, and the ends of said pins are slotted or formed with hooks with which the edges of the ring are engaged for locking the wheel in position; this ring being connected with a system of tension springs that exert thereon a rotational pull in the locking direction, while the opposed surfaces on the edges of the ring and on the insides of the hooked ends of the pins are beveled or inclined and function, under the pull of the said springs, to automatically keep the fastening tight.

The accompanying drawings show one form of the invention; Figure 1 being a side view of a portion of a wheel and hub provided with my driving and locking mechanism; the case inclosing said mechanism being drawn in section to show the locking device in edge view.

Fig. 2 is a front view showing the several parts in the positions they assume when locking the wheel to the standing hub.

Fig. 3 shows the parts of the locking device positioned to admit of the removal of the wheel from the hub.

Fig. 4 is a view of the wheel detached and showing the parts of the fastening mechanism that are carried by the wheel.

Fig. 5 shows the hub and the parts of the driving and locking system which are carried by the said hub.

Fig. 6 is a sectional view of a part of the locking ring.

Fig. 7 is a detail view of the locking-ring actuating cam.

The same letters of reference indicate corresponding parts in the several figures.

$a$ is the wheel, whose center carries, on its outer side, a box or casing $b$ that incloses the improved driving and locking mechanism, and $c$ is the standing hub which is connected, in any convenient manner, with an axle.

The inner end of the said hub has a substantial flange $c^2$ carrying as permanent fixtures thereto, a series of three (or more) equidistantly-disposed pins $c^3$ whereby driving connection is established between the detachable wheel and the said standing hub; these pins being adapted to extend through holes in the wheel center, (when the latter is secured to the hub) and also through corresponding holes $d^2$ in a ring $d$ that is fixed on the outer face of the wheel, and is provided with an annular sleeve $d^3$.

Rotatably mounted on the sleeve $d^3$ is a locking ring $e$, which is influenced, in one direction, by a suitably-applied spring or springs $f$ and is associated with a releasing or unlocking cam $g^2$, one function of which is to impart a partial rotary movement to the said ring, in opposition to the springs, when it is required to detach the wheel.

In the outer edge of the locking ring, a series of notches or gates $e^1$ are formed, corresponding in number and disposition to the holes in the center-plate $d$ and the driving pins on the hub-flange, while the inner ends of the said driving pins are formed with grooves or hooks $c^4$, which are designed to be engaged by solid or ungapped portions $e^2$ of the edge of the ring when the latter is in its wheel-locking position (see Figs. 1, 2 and 6); the said ring being retained in such engagement by the pull of the springs $f$. The driving pins of the hub then being engaged with the holes in the flange of the wheel center and by the ungapped portions of the locking ring, the wheel and hub are rigidly locked against relative movement or displacement in either the rotational or lateral direction, To automatically take up lateral play between the wheel and hub and keep the connection perfectly tight under all circumstances, the locking ring is formed, adjacent to the clearance $e^1$, with bevels or cam surfaces $e^3$ of suitable pitch, while the corresponding side of each gap in the driving pins is similarly beveled at $c^5$, as best seen in Fig. 6; the formation and arrangement of these surfaces (which are in contact when the wheel is locked onto the hub) being such that, under the pull exerted by the springs on the locking ring, the surfaces on the latter tend constantly to ride or wipe under the like surfaces of the driving-pin hooks and so exert a lateral pull which keeps the wheel center always close up to the flange of the standing hub.

To unlock the wheel, the locking ring must be so positioned that its gaps $e^1$ register with the holes $d^2$ in the wheel center-plate and so provide clear passages for the driving pins. To displace the said ring into this "release" position (which must be effected from the outside of the case or cover in which the locking ring and hooked ends of the driving pins are inclosed) a spindle $g$ is mounted on the wheel center-plate and extends through a suitable opening in the front of the casing $b$. The inner end of this spindle carries a cam-arm $g^2$ which bears against a stud $g^3$ on the locking ring and is so arranged that, on the release-spindle being turned (from the outside of the case) in a certain direction, it (the cam-arm) will act, through the stud, against the locking ring and will impart to the latter a rotational movement sufficient to disengage the solid edges of the said ring from the hooks of the drive pins and bring the gaps in alinement with the holes in the wheel center-plate. The wheel is thus freed of its locking connections and can be laterally withdrawn from the standing hub.

To obviate the necessity of holding the release spindle and locking ring by hand in their wheel-releasing positions, the end of the cam is formed with a notch $g^4$ which, after the displacement of the said ring, makes engagement with the stud $g^3$ as shown in Figs. 3, 4 and 7 and is retained therein by the pull of the springs $f$. Return movement of the locking ring is then impossible until the release-lever and cam are manually actuated in a direction that will clear the cam depression $g^4$ from the stud $g^3$ and allow the locking-ring to be restored to its locking position by the springs.

A stop $h$ is provided on some part of the wheel to prevent movement of the cam beyond its engagement with the stud $g^3$, while the outer end of the release spindle may be provided with an operating lever which can be rigidly secured to the wheel when the latter is locked on the standing hub.

To obviate any risk of the locking-ring shifting into the release position in the event of the springs breaking, the release cam is influenced by a spring $i$ whereby it normally is held in the position shown in Fig. 2 and in dotted lines in Fig. 7, where its recessed end lies behind a safety stud $i^2$ that is carried on the locking-ring. When in this position, the cam will prevent the ring being rotated in the unlocking direction through such an angular distance as would bring the release gaps into register with the drive-pins, but the safety stud will not interfere with the movement of the cam when the latter is actuated by the unlocking lever.

Having described my invention, what I claim and desire to secure by Letters Patent is:—

1. In a wheel, a removable wheel body, a rotatable locking ring carried thereby, springs to urge said ring in one direction a stud on said ring an arm pivoted on the wheel body and manually engageable with said stud to move the ring against the tension of said springs said arm being adapted to engage said stud and thereby hold said ring in unlocked position.

2. In a wheel, a removable wheel body, a rotatable locking ring carried thereby, drive pins on said body adapted to be engaged by the edge of said ring, gaps in the edge of the ring, springs to urge said ring in one direction, a stud on said ring, an arm pivoted on the wheel body and manually operable to engage with said stud to move the ring against the tension of the springs and a notched end to said arm to receive said stud and hold said ring in unlocked position.

3. In a wheel, a removable wheel body, a rotatable locking ring carried thereby, drive pins on said body, beveled portions on the edge of said ring, beveled recesses in said pins for receiving said beveled ring portions, gaps in the edge of said ring, springs having their ends secured respectively to said body and said ring to urge the said ring in one direction, a stud on said ring, an arm pivoted on the wheel body and manually operable to engage with said stud to move the ring against the tension of said springs and a notched end to said arm to receive said stud and hold said ring in unlocked position.

4. In a wheel, a removable wheel body, a rotatable locking ring carried thereby, drive pins in said body, beveled portions on the edge of said ring, beveled recesses in said pins for receiving said beveled ring portions, gaps in the edge of said ring, springs having their ends secured respectively to said body and said ring to urge said ring in one direction, a stud on said ring, an arm pivoted on the wheel body and manually operable to engage with said stud to move the ring against the tension of said springs another stud on said ring to prevent accidental unlocking of said ring, a stud on said body to limit the angular movement of said pivoted arm and a notched end to said arm which receives one of said studs on said ring to hold said ring in unlocked position or to prevent its accidental unlocking according to the direction of angular movement of said arm.

In testimony whereof I have hereunto set my hand.

JAMES LESLIE EDWARDS.